United States Patent
Jung et al.

(10) Patent No.: US 9,509,482 B2
(45) Date of Patent: Nov. 29, 2016

(54) RECEIVING METHOD FOR INTERFERENCE CANCELLATION, AND TERMINAL

(71) Applicant: LG ELECTRONICS INC., Seoul (KR)

(72) Inventors: Manyoung Jung, Seoul (KR); Sangwook Lee, Seoul (KR); Jinyup Hwang, Seoul (KR); Yoonoh Yang, Seoul (KR); Suhwan Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

(21) Appl. No.: 14/419,202

(22) PCT Filed: Aug. 12, 2013

(86) PCT No.: PCT/KR2013/007229
§ 371 (c)(1),
(2) Date: Feb. 2, 2015

(87) PCT Pub. No.: WO2014/035078
PCT Pub. Date: Mar. 6, 2014

(65) Prior Publication Data
US 2015/0207611 A1 Jul. 23, 2015

Related U.S. Application Data

(60) Provisional application No. 61/695,300, filed on Aug. 31, 2012.

(51) Int. Cl.
*H04L 5/00* (2006.01)
*H04J 11/00* (2006.01)

(52) U.S. Cl.
CPC ............ *H04L 5/0073* (2013.01); *H04J 11/004* (2013.01); *H04J 11/005* (2013.01); *H04L 5/0048* (2013.01); *H04L 5/001* (2013.01)

(58) Field of Classification Search
CPC .................................................... H04L 5/0073
See application file for complete search history.

(56) References Cited

U.S. PATENT DOCUMENTS

| | | | |
|---|---|---|---|
| 2010/0309867 A1* | 12/2010 | Palanki | H04L 5/0053 370/329 |
| 2010/0325505 A1* | 12/2010 | Shimezawa | H04L 1/005 714/748 |
| 2011/0107171 A1* | 5/2011 | Mashino | H04J 11/0066 714/751 |
| 2011/0267937 A1* | 11/2011 | Yoo | H04J 11/005 370/201 |
| 2011/0319025 A1 | 12/2011 | Siomina et al. | |
| 2012/0021753 A1 | 1/2012 | Damnjanovic et al. | |
| 2012/0087261 A1* | 4/2012 | Yoo | H04L 25/03 370/252 |

OTHER PUBLICATIONS

Hitachi Ltd., "Performance Evaluation in Heterogeneous Networks Considering CRS Interference," 3GPP TSG-RAN WG1 Meeting #66bis, R1-113062, Oct. 2011, 6 pages.
Qualcomm Incorporated, "Discussion on signaling support for CRS interference handling," 3GPP TSG-RAN WG1#68bis, R1-121877, Mar. 2012, 3 pages.
LG Electronics, "Considerations on CRS interference handling," 3GPP TSG RAN WG1 Meeting #70, R1-123511, Aug. 2012, 4 pages.
PCT International Application No. PCT/KR2013/007229, Written Opinion of the International Searching Authority dated Nov. 27, 2013, 1 page.

* cited by examiner

*Primary Examiner* — Brian D Nguyen
*Assistant Examiner* — Toan Nguyen
(74) *Attorney, Agent, or Firm* — Lee, Hong, Degerman, Kang & Waimey

(57) ABSTRACT

One embodiment of the present specification discloses a receiving method. The receiving method comprises the steps of: cancelling interference caused by a cell-specific reference signal (CRS) of a neighboring cell from a bit string received from a serving cell; determining weight to be applied to the bit string; applying the determined weight to the bit string; and decoding the bit string to which the weight is applied. In the step of determining the weight, it is possible to determine the weight to be applied depending on whether or not CRSs collide with each other between the serving cell and the neighboring cell that causes the interference.

11 Claims, 14 Drawing Sheets

FIG. 5
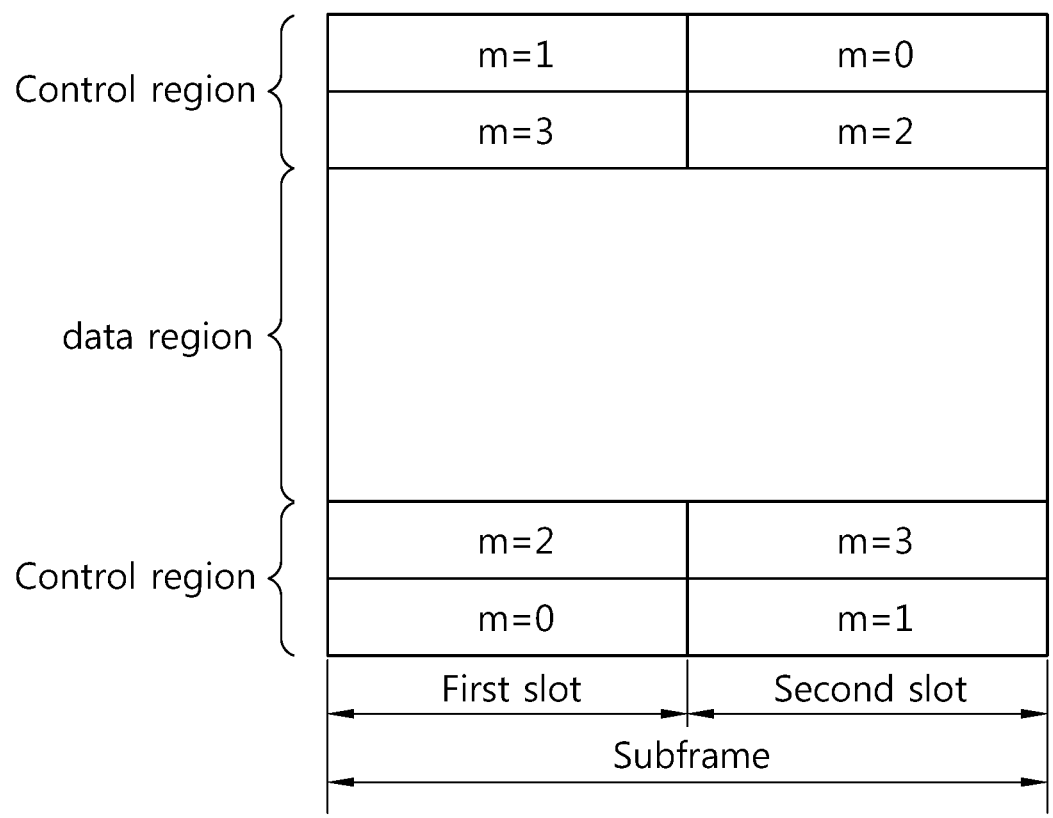
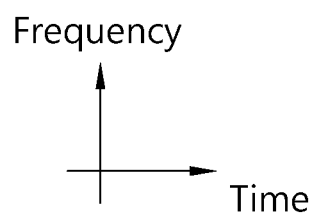

RECEIVING METHOD FOR INTERFERENCE CANCELLATION, AND TERMINAL

CROSS-REFERENCE TO RELATED APPLICATIONS

This application is the National Stage filing under 35 U.S.C. 371 of International Application No. PCT/KR2013/007229, filed on Aug. 12, 2013, which claims the benefit of U.S. Provisional Application Ser. No. 61/695,300, filed on Aug. 31, 2012, the contents of which are hereby incorporated by reference herein in their entirety.

BACKGROUND OF THE INVENTION

1. Field of the Invention

One disclosure of the present specification relates to a receiving method for interference cancellation, and a terminal.

2. Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. To understand OFDMA, OFDM should be known. OFDM may attenuate inter-symbol interference with low complexity and is in use. OFDM converts data serially input into N parallel data pieces and carries the data pieces over N orthogonal sub-carriers. The sub-carriers maintain orthogonality in view of frequency. Meanwhile, OFDMA refers to a multiple access scheme that realizes multiple access by independently providing each user with some of sub-carriers available in the system that adopts OFDM as its modulation scheme.

Recently, 3GPP LTE-A (LTE-Advanced) evolved from 3GPP LTE has been almost developed.

In addition, a heterogeneous network in which a macro cell and a small cell co-exist is under discussion in recent years. In particular, there is ongoing discussion on a traffic detour achieved by distributing a terminal having access to the macro cell to the small cell.

Meanwhile, an interference may be more and more increased due to such a small cell, and thus an interference cancellation function is desperately required.

SUMMARY OF THE INVENTION

Accordingly, one disclosure of the present specifiction aims to provide a method of implementing an interference cancellation function.

In order to achieve the aforementioned aim, one disclosure of the present specifiction provides a receiving method for interference cancellation. The receiving method may comprise: cancelling an interference caused by a CRS (Cell-specific Reference Signal) of a neighboring cell from a bit string received from a serving cell; determining a weight to be applied to the bit string; applying the determined weight to the bit string; and decoding the bit string to which the weight is applied. In the determining of the weight, the weight to be applied may be determined depending on whether or not CRSs collide with each other between the serving cell and the neighboring cell causing the interference.

In the determining of the weight, the weight to be applied varies depending on whether or not CRSs collide with each other between the serving cell and the neighboring cell causing the interference.

In the determining of the weight, the weight is determined by using a table, in which a column and a row are respectively mapped to the number of colliding neighboring cells when CRSs collide with each other between the serving cell and the neighboring cell causing the interference and to the number of non-colliding neighboring cells when the CRSs do not collide with each other.

The method may further comprise: checking whether a cyclic redundancy check (CRC) error exists as to the decoded signal; and if the CRC error exists, determining whether the CRC error occurs more than the maximum number of retransmission attempts.

The method may further comprise: if the received bit string corresponds to a retransmission according to hybrid automatic repeat request (HARQ), applying the weight to the received bit string and thereafter combining the bit string with a previously received bit string.

In order to achieve the aforementioned aim, one disclosure of the present specification also provides a terminal. The terminal may comprise: an RF (radio frequency) unit; and a processor for controlling the RF unit to cancel an interference caused by a CRS (Cell-specific Reference Signal) of a neighboring cell from a bit string received from a serving cell, to determine a weight to be applied to the bit string, and to perform decoding after multiplexing the determined weight by the bit string. The processor may determine the weight to be applied depending on whether or not CRSs collide with each other between the serving cell and the neighboring cell causing the interference.

According to one disclosure of the present specifiction, a reception performance can be improved by using an interference cancellation function.

BRIEF DESCRIPTION OF THE DRAWINGS

FIG. 5 illustrates the architecture of an uplink sub-frame in 3GPP LTE.

DESCRIPTION OF EXEMPLARY EMBODIMENTS

Figure 1:
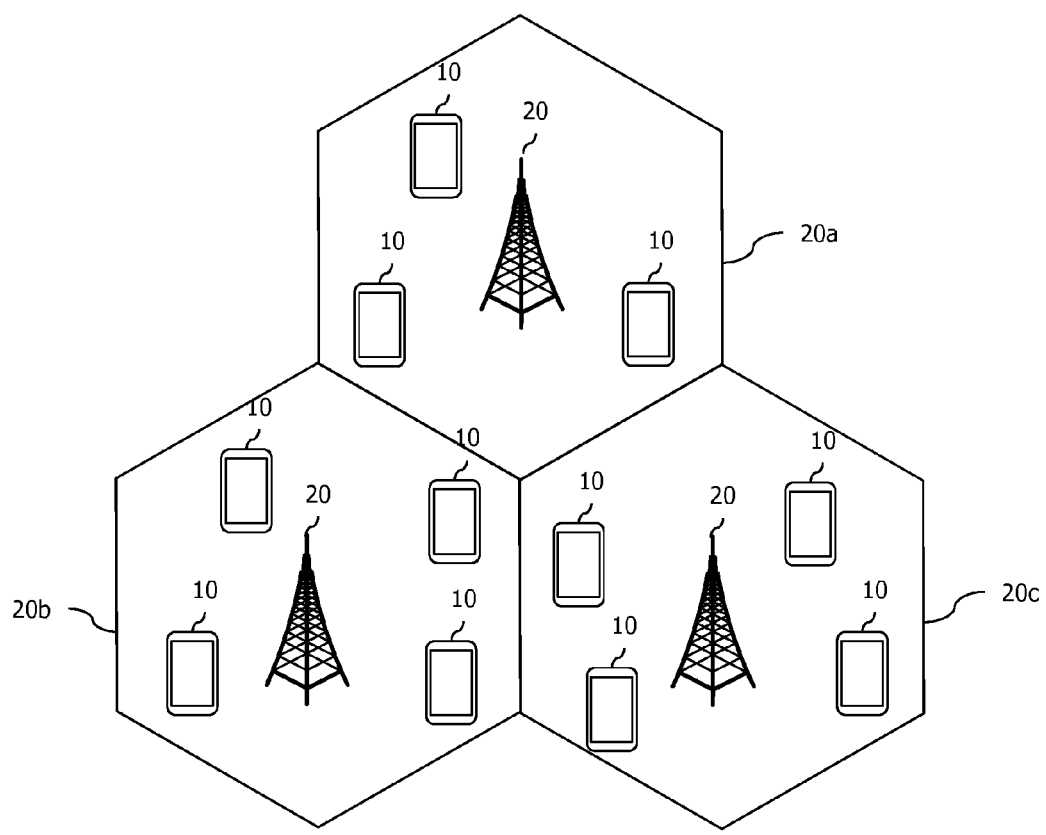
FIG. 1 shows a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 shows a wireless communication system.

The wireless communication system 10 includes at least one base station (BS) 20. Respective BSs 20 provide a communication service to particular geographical areas 20a, 20b, and 20c (which are generally called cells). Each cell may be divided into a plurality of areas (which are called sectors). A user equipment (UE) 10 may be fixed or mobile and may be referred to by other names such as mobile station (MS), mobile user equipment (MT), user user equipment (UT), subscriber station (SS), wireless device, personal digital assistant (PDA), wireless modem, handheld device. The BS 201 generally refers to a fixed station that communicates with the UE 10 and may be called by other names such as evolved-NodeB (eNB), base transceiver system (BTS), access point (AP), etc.

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, a wireless communication system may be divided into a frequency division duplex (FDD) method and a time division duplex (TDD) method. Based on the FDD method, an uplink transmission and a downlink transmission are progressed in different frequency bands. Based on the TDD method, the uplink transmission and the downlink transmission are performed in the same frequency band at different times. A channel response of a TDD method is actually reciprocal. This means the downlink channel response and the uplink channel response are almost same in the current frequency domain. Therefore, there is an advantage in that the downlink channel response in the wireless communication system based on the TDD may be obtained from the uplink channel response. In the TDD method, as the whole frequency domain is divided into an uplink transmission and a downlink transmission by time-share, it is not available to perform the downlink transmission by a terminal and the uplink transmission by a UE at the same time. In the TDD system in which an uplink transmission and a downlink transmission are divided by a subframe unit, the uplink transmission and the downlink transmission are performed in different subframes.

Hereinafter, the LTE system is described in further detail.

Figure 2:
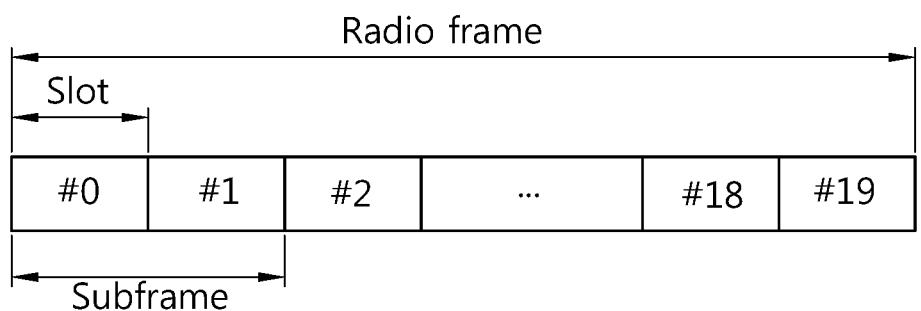
FIG. 2 illustrates a structure of a radio frame according to FDD in 3GPP LTE.

FIG. 2 illustrates the architecture of a radio frame according to FDD in 3GPP LTE.

Referring to FIG. 2, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Figure 3:
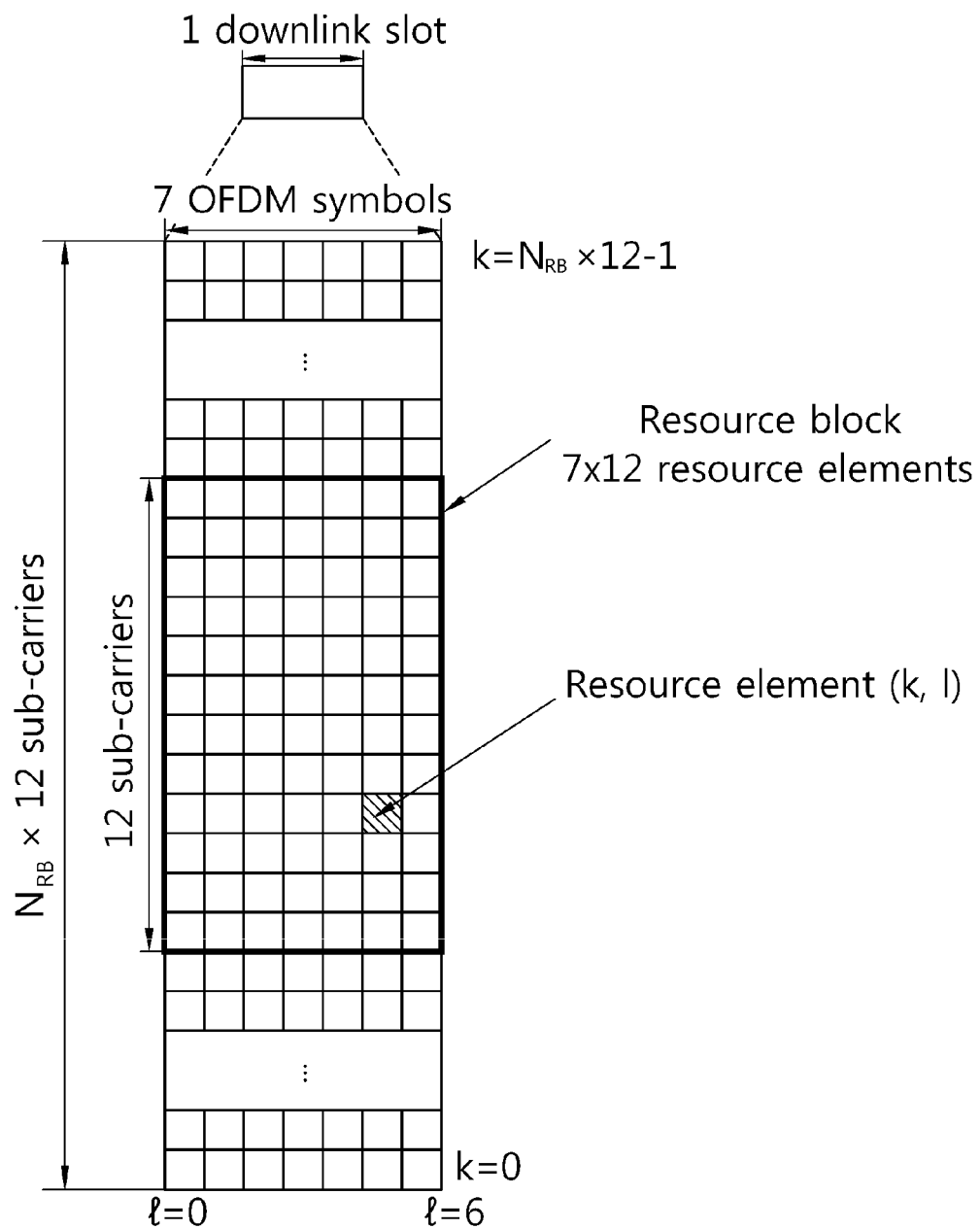
FIG. 3 is an exemplary diagram illustrating a resource grid for one uplink or downlink slot in the 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NUL resource blocks (RBs) in the frequency domain. OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

Figure 4:
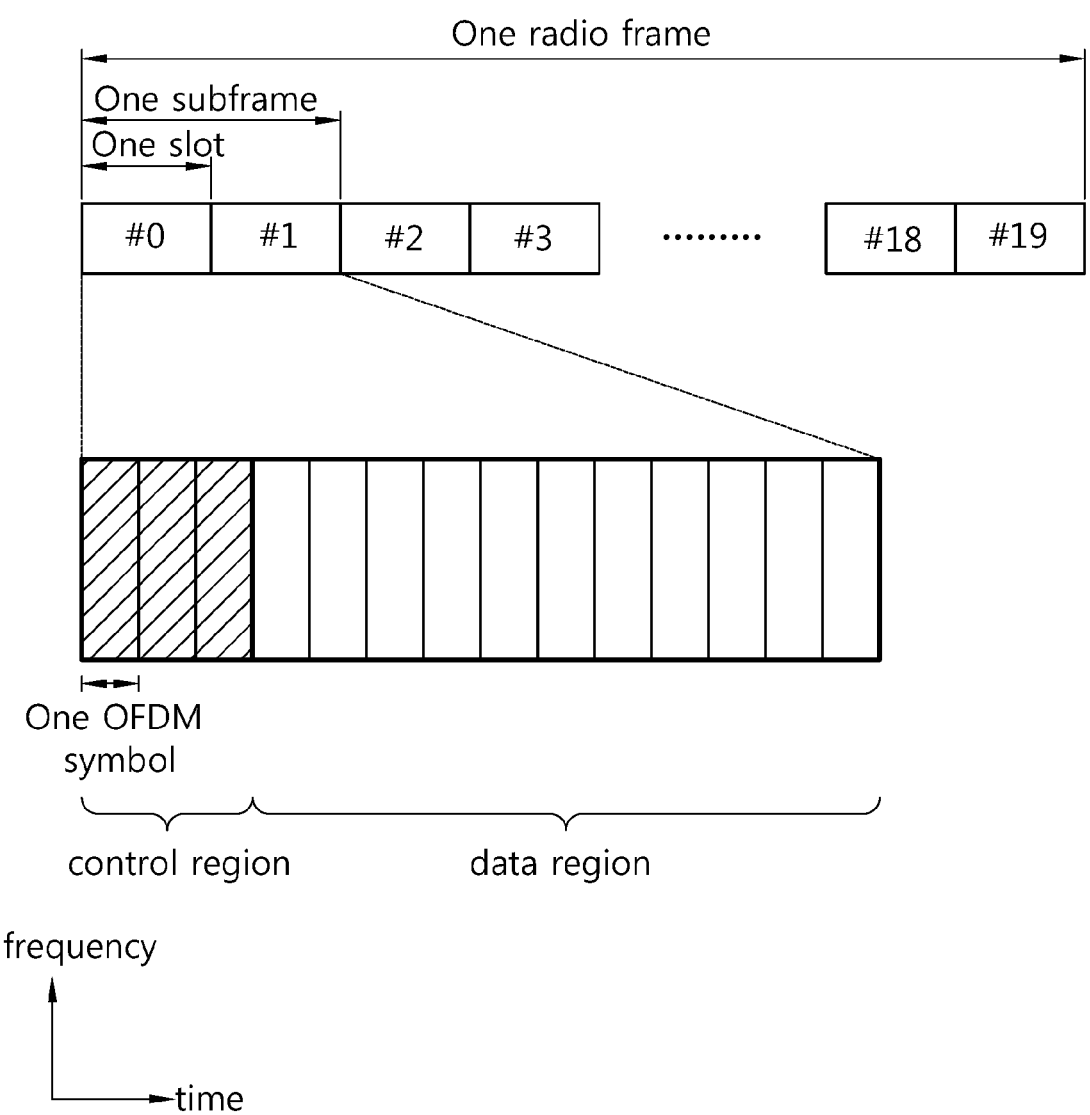
FIG. 4 illustrates the architecture of a downlink sub-frame.

In 3GPP LTE, the resource grid for one uplink slot shown in FIG. 4 may also apply to the resource grid for the downlink slot.

FIG. 4 illustrates the architecture of a downlink subframe.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Here, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary. The terminal may obtain a frequency diversity gain by transmitting uplink control information through different sub-carriers over time.

Figure 6:
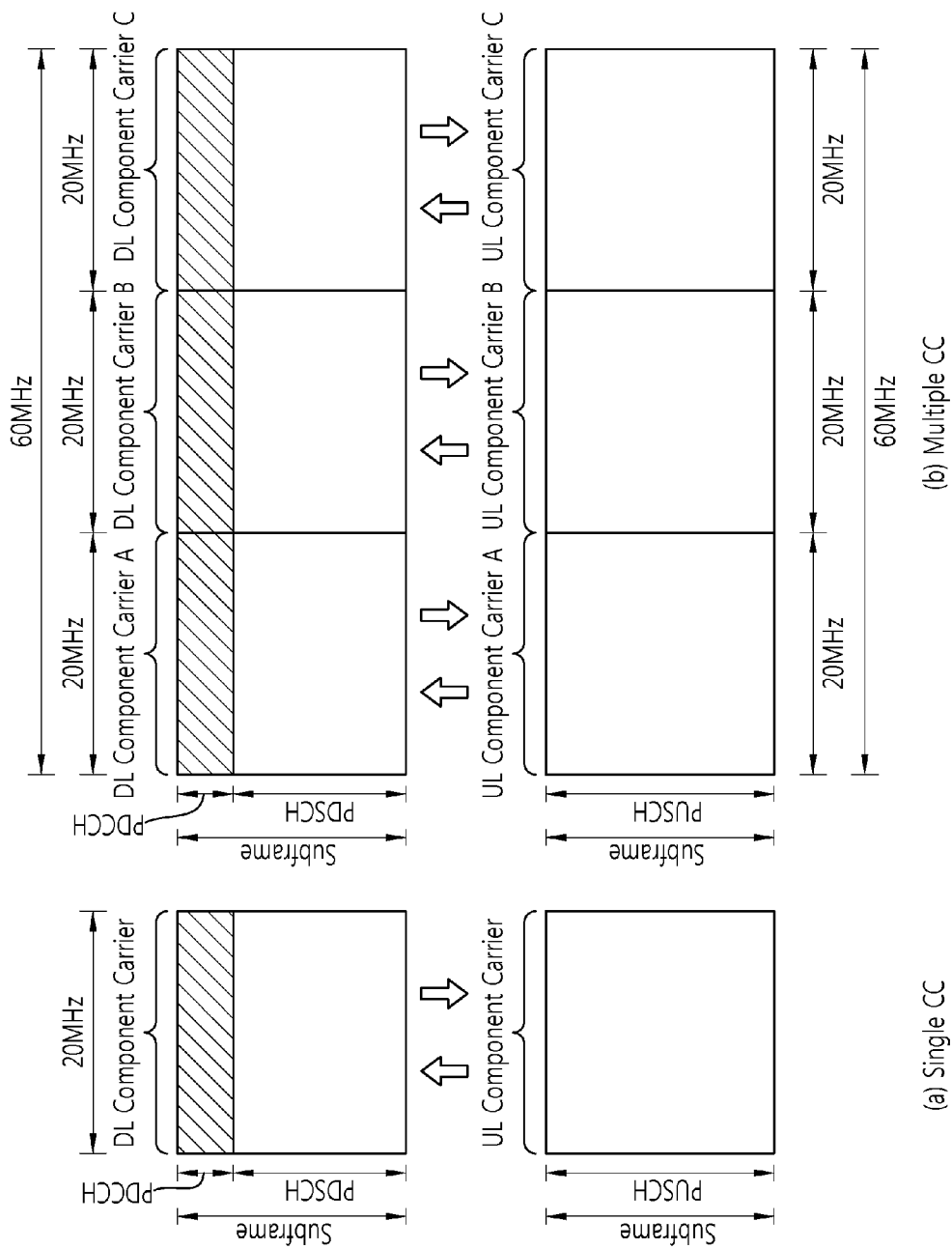
FIG. 6 illustrates an example of comparison between a single carrier system and a carrier aggregation system.

FIG. 6 illustrates an example of comparison between a single carrier system and a carrier aggregation system.

Referring to FIG. 6(a), a typical FDD wireless communication system supports one carrier for uplink and downlink. In this case, the carrier may have various bandwidths, but only one carrier is assigned to the user equipment.

In other words, in the typical FDD wireless communication system, data transmission and reception is carried out through one downlink band and one uplink band corresponding thereto. The bit stream and the user equipment transmit and receive control information and/or data scheduled for each sub-frame. The data is transmitted/received through the data region configured in the uplink/downlink sub-frame, and the control information is transmitted/received through the control region configured in the uplink/downlink sub-frame. For this, the uplink/downlink sub-frame carries signals through various physical channels. Although the description in connection with FIG. 7 primarily focuses on the FDD scheme for ease of description, the foregoing may be applicable to the TDD scheme by separating the radio frame for uplink/downlink in the time domain.

As shown in FIG. 6(a), data transmission/reception performed through one downlink band and one uplink band corresponding to the downlink band is referred to as a single carrier system.

Such single carrier system may correspond to an example of communication in the LTE system. Such 3GPP LTE system may have an uplink bandwidth and a downlink bandwidth that differ from each other, but supports up to 20 MHz.

Meanwhile, a high data transmission rate is demanded. The most fundamental and stable solution to this is to increase bandwidth.

However, the frequency resources are presently saturated, and various technologies are partially being in use in a wide range of frequency band. For such reason, as a method for securing a broad bandwidth to satisfy the demand for higher data transmission rate, each scattered band may be designed to meet basic requirements for being able to operate an independent system, and carrier aggregation (CA) whose concept is to bundle up multiple bands to a single system has been introduced.

That is, the carrier aggregation (CA) system means a system that constitutes a broadband by gathering one or more carriers each of which has a bandwidth narrower than the targeted broadband when supporting a broadband in the wireless communication system.

Such carrier aggregation (CA) technology is also adopted in the LTE-advanced (hereinafter, 'LTE-A'). The carrier aggregation (CA) system may also be referred to as a multiple-carrier system or bandwidth aggregation system.

In the carrier aggregation (CA) system, a user equipment may simultaneously transmit or receive one or more carriers depending on its capabilities. That is, in the carrier aggregation (CA) system, a plurality of component carriers (CCs) may be assigned to a user equipment. As used herein, the term "component carrier" refers to a carrier used in a carrier aggregation system and may be abbreviated to a carrier. Further, the term "component carrier" may mean a frequency block for carrier aggregation or a center frequency of a frequency block in the context and they may be interchangeably used.

FIG. 6(b) may correspond to a communication example in an LTE-A system.

Referring to FIG. 6(b), in case, e.g., three 20 MHz component carriers are assigned to each of uplink and downlink, the user equipment may be supported with a 60 MHz bandwidth. Or, for example, if five CCs are assigned as granularity of the unit of carrier having a 20 MHz bandwidth, up to 100 MHz may be supported. FIG. 6(b) illustrates an example in which the bandwidth of an uplink component carrier is the same as the bandwidth of a downlink component carrier for ease of description. However, the bandwidth of each component carrier may be determined independently. When aggregating one or more component carriers, a targeted component carrier may utilize the bandwidth used in the existing system for backward compatibility with the existing system. For example, in a 3GPP LTE system, bandwidths of 1.4 MHz, 3 MHz, 5 MHz, 10 MHz, 15 MHz and 20 MHz may be supported. Accordingly, the bandwidth of an uplink component carrier may be constituted like 5MHz (UL CC0)+20 MHz (UL CC1)+20 MHz (UL CC2)+20 MHz (UL CC3)+5MHz (UL CC4), for example. However, without consideration of backward compatibility, a new bandwidth may be defined rather the existing system bandwidth being used, to constitute a broadband.

FIG. 6(b) illustrates an example in which the number of uplink component carriers is symmetric with the number of downlink component carriers for ease of description. As such, when the number of uplink component carriers is the same as the number of downlink component carriers is denoted symmetric aggregation, and when the number of uplink component carriers is different from the number of downlink component carriers is denoted asymmetric aggregation.

The asymmetric carrier aggregation may occur due to a restriction on available frequency bands or may be artificially created by a network configuration. As an example, even when the entire system band comprises N CCs, the frequency band where a particular user equipment may perform reception may be limited to M (<N) CCs. Various parameters for carrier aggregation may be configured cell-specifically, UE group-specifically, or UE-specifically.

Meanwhile, carrier aggregation systems may be classified into contiguous carrier aggregation systems where each carrier is contiguous with another and non-contiguous carrier aggregation systems where each carrier is spaced apart from another. A guard band may be present between the carriers in the contiguous carrier aggregation system. Hereinafter, simply referring to a multi-carrier system or carrier aggregation system should be understood as including both when component carriers are contiguous and when component carriers are non-contiguous.

Meanwhile, the concept of cell as conventionally appreciated is varied by the carrier aggregation technology. In other words, according to the carrier aggregation technology, the term "cell" may mean a pair of a downlink frequency resource and an uplink frequency resource. Or, the cell may mean a combination of one downlink frequency resource and an optional uplink frequency resource.

In other words, according to the carrier aggregation technology, one DL CC or a pair of UL CC and DL CC may correspond to one cell. Or, one cell basically includes one DL CC and optionally includes a UL CC. Accordingly, a user equipment communicating with a bit stream through a plurality of DL CCs may be said to receive services from a plurality of serving cells. In this case, although downlink is constituted of a plurality of DL CCs, uplink may be used by only one CC. In such case, the user equipment may be said to receive services from a plurality of serving cells for downlink and to receive a service from only one serving cell for uplink.

Meanwhile, in order for packet data to be transmitted/received through a cell, configuration for a particular cell should be completed. Here, the term "configuration" means the state where system information necessary for data transmission/reception on a corresponding cell is completely received. For example, the configuration may include the overall process of receiving common physical layer parameters necessary for data transmission/reception, MAC (media access control) layer parameters, or parameters necessary for a particular operation in RRC layer. The configuration-completed cell is in the state where packet transmission/reception is possible simply when information indicating that packet data may be transmitted is received.

The configuration-completed cell may be left in activation or deactivation state. Here, the term "activation" refers to data transmission or reception being performed or being ready. The UE may monitor or receive a control channel (PDCCH) or data channel (PDSCH) of an activated cell in order to identify resources (which may be frequency or time) assigned thereto.

Transmission or reception with a deactivated cell is impossible, while measurement or transmission/reception of least information is possible. The user equipment may receive system information (SI) necessary for receiving packets from a deactivated cell. In contrast, the user equipment does not monitor or receive the control channel (PDCCH) and data channel (PDSCH) of deactivated cells to identify resources (which may be frequency or time) assigned thereto.

In accordance with carrier aggregation technology, thus, activation/deactivation of a component carrier may be the same in concept as activation/deactivation of a serving cell. For example, assuming that serving cell 1 comprises DL CC1, activation of serving cell 1 means activation of DL CC1. Assuming that serving cell 2 is configured so that DL CC2 is connected with UL CC2, activation of serving cell 2 means activation of DL CC2 and UL CC2. In that regard, each component carrier may correspond to a serving cell.

On the other hand, a change in the concept of serving cell as conventionally understood by the carrier aggregation technology leads to primary cells and secondary cells being separated from each other.

The primary cell refers to a cell operating in a primary frequency and means a cell where the user equipment performs an initial connection establishment procedure or connection re-establishment procedure with a bit stream or a cell designated so during the course of handover.

The secondary cell means a cell operating in a secondary frequency, and is configured once an RRC connection is established and is used to provide additional radio resources.

The PCC (primary component carrier) means a component carrier (CC) corresponding to the primary cell. The PCC means a CC where the user equipment initially achieves connection (or RRC connection) with the base station among various CCs. The PCC is a special CC that is in charge of connection (or RRC connection) for signaling regarding multiple CCs and that manages UE context that is connection information relating to the UE. Further, the PCC, in case the PCC achieves connection with the UE so that it is in RRC connected mode, always remains in activated state. The downlink component carrier corresponding to the primary cell is referred to as a downlink primary component carrier (DL PCC), and the uplink component carrier corresponding to the primary cell is referred to as an uplink primary component carrier (UL PCC).

The SCC (secondary component carrier) means a CC corresponding to the secondary cell. That is, the SCC is a CC assigned to the user equipment, which is not the PCC, and the SCC is an extended carrier for the user equipment to assign additional resources other than the PCC. The SCC may stay in activated state or deactivated state. The downlink component carrier corresponding to the secondary cell is referred to as a downlink secondary component carrier (DL SCC), and the uplink component carrier corresponding to the secondary cell is referred to as an uplink secondary component carrier (UL SCC).

The primary cell and the secondary cell have the following features.

First, the primary cell is used for transmission of a PUCCH. Second, the primary cell always remain activated while the secondary cell switches between activation/deactivation depending on particular conditions. Third, when the primary cell experiences radio link failure (hereinafter, "RLF"), the RRC reconnection is triggered. Fourth, the primary cell may be varied by a handover procedure that comes together with security key changing or an RACH (Random Access CHannel) procedure. Fifth, NAS (non-access stratum) information is received through the primary cell. Sixth, in the case of an FDD system, the primary cell is constituted of a pair of DL PCC and UL PCC. Seventh, a different component carrier may be set as the primary cell for each user equipment. Eighth, primary cells may be exchanged only by a handover, cell selection/cell reselection process. In adding a new secondary cell, RRC signaling may be used to transmit system information of the dedicated secondary cell.

As described above, the carrier aggregation system may support a plurality of component carriers (CCs), i.e., a plurality of serving cells, unlike the single carrier system.

Such carrier aggregation system may support cross-carrier scheduling. The cross-carrier scheduling is a scheduling method that allows for resource allocation of a PDSCH transmitted through other component carrier through a PDCCH transmitted through a particular component carrier and/or resource allocation of a PUSCH transmitted through other component carrier than the component carrier basically linked with the particular component carrier. That is, a PDCCH and a PDSCH may be transmitted through different downlink CCs, and a PUSCH may be transmitted through an uplink CC other than an uplink CC linked with a downlink CC through which a PDCCH including a UL grant is transmitted. As such, the cross-carrier scheduling-supportive system requires a carrier indicator indicating a DL CC/UL CC through which a PDSCH/PUSCH through which a PDCCH provides control information is transmitted. The field containing such carrier indicator is hereinafter referred to as a carrier indication field (CIF).

The carrier aggregation system supportive of cross-carrier scheduling may include a carrier indication field (CIF) in the conventional DCI (downlink control information) format. A cross-carrier scheduling-supportive system, e.g., an LTE-A system, adds a CIF to the existing DCI format (i.e., DCI format used in LTE), so that it may be extended with three bits, and it may reuse the existing coding scheme, resource allocation scheme (i.e., CCE-based resource mapping) for the PDCCH structure.

Now, HARQ in 3GPP LTE is described.

The 3GPP LTE uses synchronous HARQ in UL transmission, and uses asynchronous HARQ in DL transmission. In the synchronous HARQ, retransmission timing is fixed. In the asynchronous HARQ, the retransmission timing is not fixed. In the synchronous HARQ, initial transmission and retransmission are performed with an HARQ interval.

Figure 7:
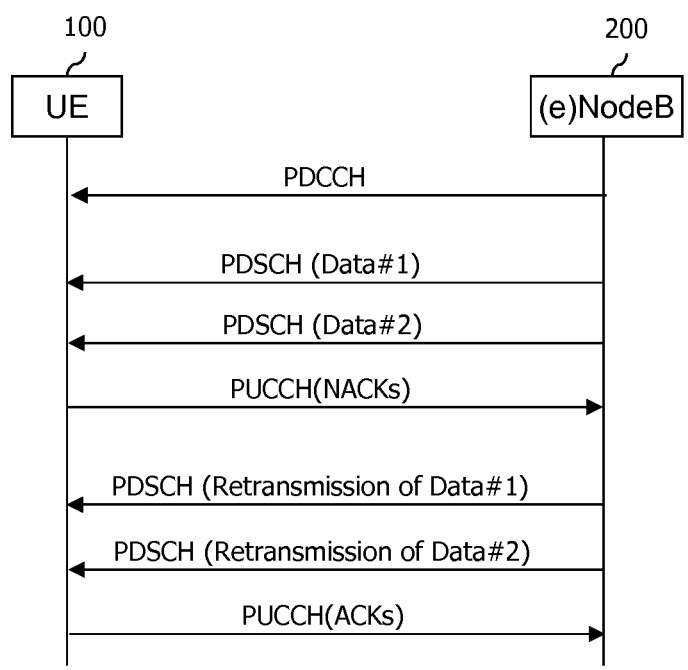
FIG. 7 illustrates an exemplary operation of HARQ between a base station (BS) and a user equipment (UE).

FIG. 7 illustrates an exemplary operation of HARQ between a BS and a UE.

As shown in FIG. 7, for effective data transmission, an HARQ operation may be performed in a MAC layer. A detailed HARQ operation procedure is as follows.

First, in order to transmit data to a terminal, i.e., a UE 100, by using an HARQ scheme, a BS, i.e., an eNodeB 200, transmits scheduling information through a PDCCH (Physical Downlink Control CHannel).

The UE 100 monitors the control channel, that is, the PDCCH, and thus confirms the scheduling information to be delivered to the UE 100.

If it is confirmed that there is information on the UE 100 as a result of confirming the scheduling information, the UE 100 receives data (e.g., data #1 and data #2) from the eNodeB 200 through a PSCH (Physical Shared CHannel) at a time related to the PDCCH.

When data is received, the UE 100 attempts to decode the data. The UE transmits an HARQ feedback to the eNobdeB 200 according to the decoding result. That is, the UE 100 transmits an ACK signal if the decoding is successful and a NACK signal if the decoding fails, to the eNodeB 200 through the PUCCH or the PUSCH.

If the ACK signal is received, the eNodeB 200 detects that data transmission to the UE is successful, and transmits next data.

However, if the NACK signal is received, the eNodeB 200 detects that the data transmission to the UE 100 fails, and retransmits the same data at a proper time by using the same format or a new format.

The UE 100 which transmits the NACK signal attempts to receive the retransmitted data.

Upon receiving the retransmitted data, the UE 100 combines it with data stored in a buffer in a state of being failed in previous decoding, and thus attempts the decoding again. The UE transmits an ACK signal if the decoding is successful and a NACK signal if the decoding fails, to the eNodeB 200 through the PUCCH or the PUSCH. The UE 100 repeats a process of sending the NACK signal and performing retransmission until the data is successfully decoded.

HARQ in a downlink, that is, a direction from the eNodeB 200 to the UE 100, has been described above.

Figure 8:
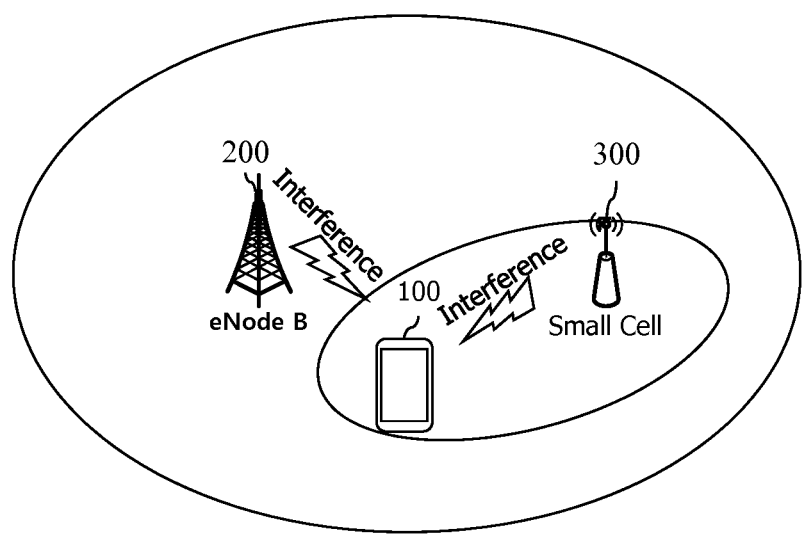
FIG. 8 illustrates a heterogeneous network including a macro cell and a small cell.

FIG. 8 illustrates a heterogeneous network including a macro cell and a small cell.

A heterogeneous network in which a small cell (e.g., a pico cell, a femto cell, or a micro cell) having lower-power transmit power exists in the existing macro cell coverage in an overlapping manner is under discussion in a next-generation communication standard including 3GPP LTE-A.

Referring to FIG. 8, the macro cell may overlap with one or more micro cells. A service of the macro cell is provided by a macro eNodeB (MeNB). In the present specifiction, the macro cell and the MeNB may be used together. A UE having access to the macro cell may be referred to as a macro UE. The macro UE receives a downlink signal from the MeNB, and transmits an uplink signal to the MeNB.

The aforementioned small cell is also referred to as a femto cell, a pico cell, or a macro cell. A service of the small cell is provided by a pico eNodeB, a home eNodeB (HeNB), a relay node (RN), etc. For convenience, the pico eNodeB, the HeNB, and the RN are collectively referred to as the HeNB. In the present specifiction, the macro cell and the HeNB may be used together.

The small cell may be divided into an open access (OA) cell and a closed subscriber group (CSG) cell according to an accessibility. The OA cell implies a cell in which the UE can receive a service anytime when necessary without an additional access restriction. On the other hand, the CSG cell implies a cell in which only an authorized specific UE can receive a service.

The heterogeneous network has an inter-cell interference problem since the macro cell and the small cell overlap. As illustrated, if the UE is located in a boundary of the macro cell and the small cell, a downlink signal from the macro cell may act as an interference. Similarly, a downlink signal of the small cell may also act as an interference.

For a more specific example, when the UE 100 connected to the small cell 300 is located in a boundary of the small cell, the connection with the small cell 300 may be disconnected due to an interference from the macro cell 200. This implies that a coverage of the small cell 300 is smaller than expected.

For another example, if the UE 100 connected to the macro cell 200 is located in an area of the small cell 300, the connection with the macro cell 200 may be disconnected due to an interference from the small cell 300. This implies that a shadow area exists in the macro cell 200.

In the most fundamental method for solving such an interference problem, different frequencies are used between cells. However, since a frequency is a rare and expensive resource, a method of solving the problem by using a frequency division is not much welcomed by a vendor.

Therefore, 3GPP intends to solve such an inter-cell interference problem through a time division.

Accordingly, an enhanced inter-cell interference coordination (eICIC) is actively under research recently as one of interference coordination methods in 3GPP.

The time division method introduced in LTE release-10 is called an enhanced inter-cell interference coordination (ICIC) in a sense that it is more enhanced than the conventional frequency division method. In this method, an interfering cell is called an aggressor cell or a primary cell, and an interfered cell is defined as a victim cell or a secondary cell. The aggressor cell or the primary cell stops a data transmission in a specific subframe, and a UE is allowed to maintain a connection with the victim cell or the secondary cell in the corresponding subframe. That is, in this method, if heterogeneous cells co-exist, one cell temporarily stops signal transmission as to a UE which experiences a significantly high interference in a certain area, so that an interference signal is almost not sent.

Meanwhile, a specific subframe in which the data transmission stops is called an almost blank subframe (ABS). No data is transmitted other than essential control information in a subframe corresponding to the ABS. For example, the essential control information is a cell-specific reference signal (CRS). In the current 3GPP LTE/LTE-A standard, the CRS signal exists only in OFDM symbols #0, #4, #7, and #11 in each subframe on a time axis. Accordingly, in the subframe to which the ABS is applied, only the CRS signal is transmitted on the OFDM symbols #0, #4, #7, and #11.

Figure 9:
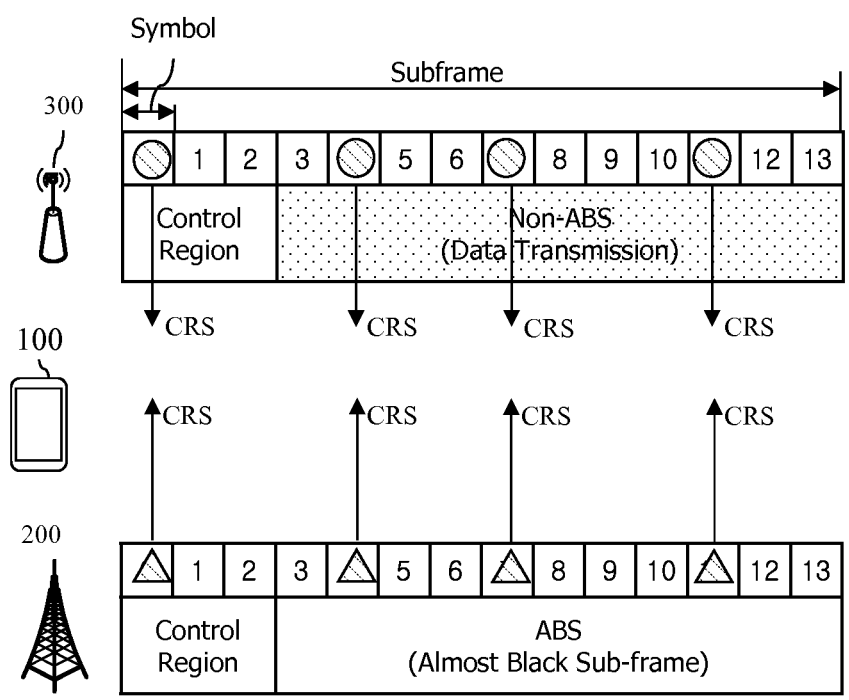
FIG. 9 illustrates an example of an enhanced inter-cell interference coordination (eICIC) for solving an interference between BSs.

FIG. 9 illustrates an example of an enhanced inter-cell interference coordination (eICIC) for solving an interference between BSs.

Referring to FIG. 9, a macro cell, i.e., the eNodeB 200, operates a subframe as an ABS.

The small cell 300 corresponding to the aforementioned pico cell performs data transmission in a data region of the subframe. A CRS is transmitted on symbols #0, #4, #7, and #11.

On the other hand, when the eICIC is applied, the subframe is operated based on the ABS, and thus the macro cell, i.e., the eNodeB 200, may not transmit any data in the data region. However, only the CRS may be transmitted on the subframe which is operated based on the ABS.

As described above, in addition to solving an inter-cell interference problem by using the eICIC scheme, there may be a method of adding an interference cancellation function to the UE 100. Hereinafter, the method of adding the interference cancellation function is described.

Figure 10:
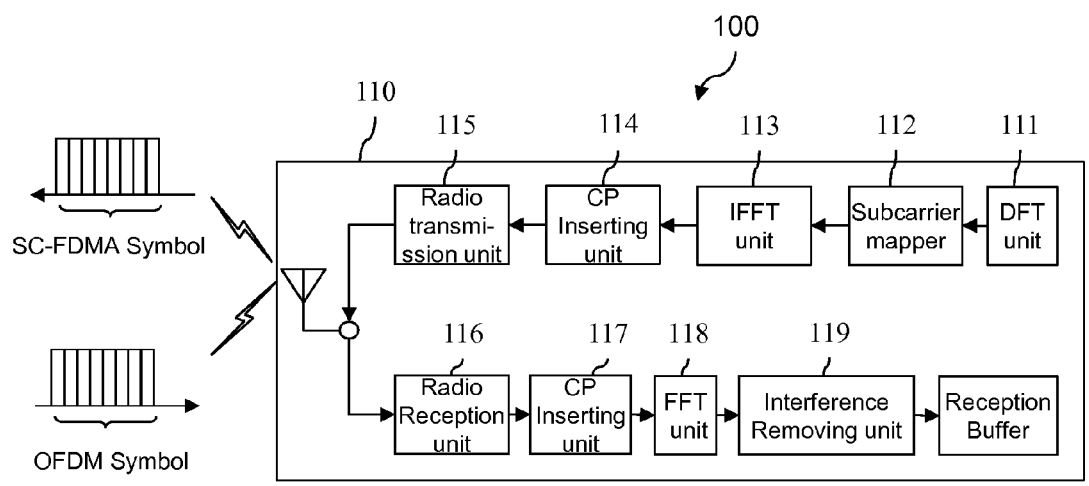
FIG. 10 is a block diagram representing a structure of a UE according to 3GPP LTE as an example.

FIG. 10 is a block diagram representing a structure of a UE according to 3GPP LTE as an example.

In the long-term evolution (LTE) or LTE-A, an orthogonal frequency division multiplexing (OFDM) is used in downlink, but a single-carrier (SC)-FDMA (similar to OFDM) is used in uplink.

FDMA may be said to be DFT-s OFDM (DFT-spread OFDM). When using the SC-FDMA transmission scheme, the non-linear distortion of power amplifier may be avoided, thus allowing power consumption-limited user equipment to enjoy increased transmission power efficiency. Accordingly, user throughput may be increased.

SC-FDMA is similar to OFDM in that SC-FDMA also employs FFT (Fast Fourier Transform) and IFFT (Inverse-FFT). However, the problem with the existing OFDM transmitters is that signals over each sub-carrier on frequency axis are converted to signals on time axis by IFFT. That is, IFFT is in the form of performing the same parallel operation, thus causing an increase in PAPR (Peak to Average Power Ratio). To prevent such increase in PAPR, SC-FDMA, unlike OFDM, performs IFFT after DFT spreading. In other words, the transmission scheme of performing IFFT after DFT spreading is referred to as SC-FDMA. Thus, SC-FDMA is also called DFT spread OFDM (DFT-s-OFDM).

Such advantages of SC-FDMA led to being robust for multi-path channels thanks to similar structure to OFDM while enabling efficient use of power amplifier by fundamentally solving the problem of existing OFDM that OFDM causes increased PAPR due to IFFT operation.

Referring to FIG. 10, a UE 100 includes a RF unit 110. The RF unit 110 includes a transmission terminal, that is, a discrete Fourier transform (DFT) unit 111, a subcarrier mapper 112, an IFFT unit 113 and a CP insertion unit 114, and a radio transmission unit 115. The transmission terminal of the RF unit 110 further includes, for example, a scramble unit (not shown), a modulation mapper (not shown), a layer mapper (not shown) and a layer permutator (not shown), and those are arranged ahead of the DFT unit 111. That is, as previously described, in order to prevent an increase of PAPR, the transmission terminal of the RF unit 110 has the information gone through the DFT 111 before signals mapped to a subcarrier. The signal that is spread (or precoded in the same meaning) by the DFT 111 is mapped to a subcarrier through a subcarrier mapper 112, and after that, made into a signal on the time axis passing through an inverse fast Fourier transform (IFFT) unit again.

That is, due to the correlation among the DFT unit 111, the subcarrier mapper 112 and the IFFT unit 113, peak-to-average power ratio (PAPR) of later time domain signal of the IFFT unit 113 is not significantly increased in the SC-FDMA, different from the case of the OFDM, and accordingly, it is beneficial in the aspect of transmission power efficiency. That is, in the SC-FDMA, the PAPR or cubic metric (CM) may be decreased.

The DFT unit 111 outputs complex-valued symbols by performing DFT for the input symbols. For example, when Ntx symbols are inputted (Ntx is natural numbers), the size of DFT is Ntx. The DFT unit 111 may be called a transform precoder. The subcarrier mapper 112 maps the complex-valued symbols to each subcarrier in the frequency domain. The complex-valued symbols may be mapped to the resource elements that correspond to the resource blocks allocated for data transmission. The subcarrier mapper 112 may be called a resource element mapper. The IFFT unit 113 outputs baseband signal for data which is a time domain signal by performing IFFT for the inputted symbol. The CP insertion unit 114 copies a part of a rear part of the baseband signal for data and inserts it into a front part of the baseband signal for data. The inter-symbol interference (ISI) and the inter-carrier interference (ICI) are prevented by inserting the CP, thereby orthogonality can be maintained even in multi-path channel.

Meanwhile, 3GPP is actively standardizing LTE-Advanced that is an advanced version of LTE and has adopted clustered DFT-s-OFDM scheme that permits non-contiguous resource allocation.

Clustered DFT-s OFDM transmission scheme is a modification of the conventional SC-FDMA transmission scheme, and is a method of mapping by dividing the data symbols that have passed through the precoder into a plurality of subblocks and separating them in the frequency domain. Some major features of the clustered DFT-s-OFDM scheme include enabling frequency-selective resource allocation so that the scheme may flexibly deal with a frequency selective fading environment.

In this case, the clustered DFT-s-OFDM scheme adopted as an uplink access scheme for LTE-advanced, unlike the conventional LTE uplink access scheme, i.e., SC-FDMA, permits non-contiguous resource allocation, so that uplink data transmitted may be split into several units of cluster.

In other words, while the LTE system is rendered to maintain single carrier characteristics in the case of uplink, the LTE-A system allows for non-contiguous allocation of DFT_precoded data on frequency axis or simultaneous transmission of PUSCH and PUCCH. In such case, the single carrier features are difficult to maintain.

On the other hand, the RF unit 110 may include a reception terminal, for example, a radio reception unit 116, a CP removing unit 117, a FFT unit 118, an interference removing unit 119, and reception buffer etc. The radio reception unit 116, the CP removing unit 117 and the FFT unit 118 of the reception terminal perform reverse functions of the radio transmission unit 115 the CP insertion unit 114 and the IFFT unit 113.

The interference removing unit 119 removes or alleviates the interference included in the signal received.

The interference removing unit 119 is added to cancel an interference caused by a small cell as shown in FIG. 8 in addition to coping with a required radio data amount which is explosively increasing recently.

Figure 11:
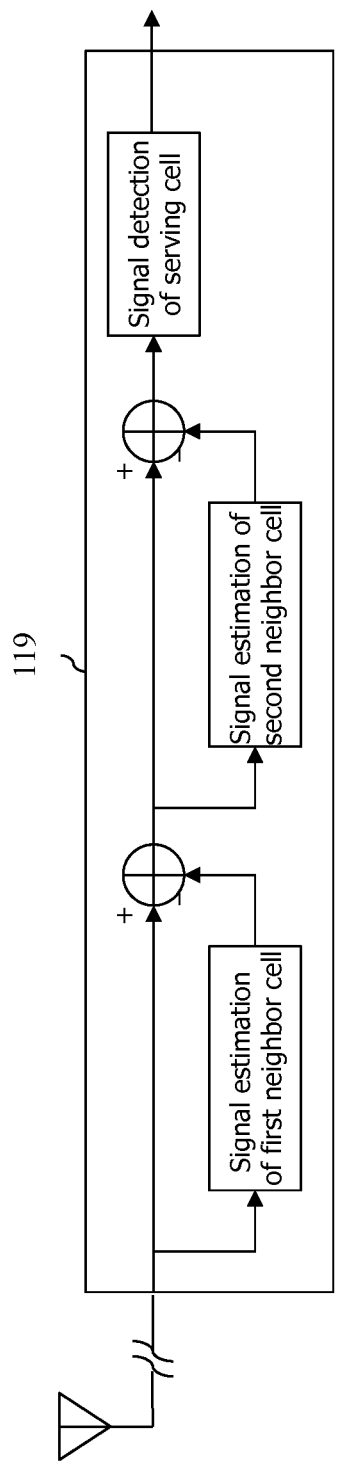
FIG. 11 is a block diagram illustrating an operation of an interference removing unit of FIG. 10.

FIG. 11 is a block diagram illustrating an operation of an interference removing unit of FIG. 10.

A receiver to which the interference removing unit is added, that is, an interference cancellation (IC) receiver, may be implemented in concept by removing an interference signal from a reception (Rx) signal.

In this case, a complexity of the IC receiver depends on the maximum number of cells which are targets of interference cancellation and a type of a signal to be removed. In FIG. 11, an operation of performing interference cancellation for up to two interference sources is shown.

The signal which is the target of interference cancellation may be CRS(Cell-specific Reference Signal), PBCH (Physical Broadcasting Channel), SCH(Sync Channel), PDSCH (Physical downlink shared channel), etc.

In particular, since the PDSCH is retransmitted from a BS according to HARQ, reception efficiency can be improved. Therefore, the interference cancellation may be unnecessary since it may cause a complexity in implementation. Similarly, in case of a PBCH, since the same data is repetitively transmitted from the BS every 10 ms with a period of 40 ms, the interference cancellation may be necessary given that it may cause a complexity in implementation.

The following description is about the procedure described above in which data transmitted/retransmitted through a PDSCH from a serving cell is typically demodulated by using a CRS without having to perform an interference cancellation on a PDSCH from a neighboring cell.

In brief, according to a typical demodulation procedure, a signal retransmitted through a PDSCH in each subframe is demodulated with a channel estimation value of a corresponding reception duration, and thereafter is combined with a previous signal, and then decoding is performed with the combined signal. More specifically, it can be described as follows.

1) First, an Rx buffer is initialized.
2) A currently received Rx bit string is combined at a corresponding location of the Rx buffer by simply adding with a previously received bit string.
3) Decoding is performed on the combined signal.
4) An error is recognized through CRC detection.

The above processes 2 to 4 are repeated within the maximum number of retransmission attempts.

6) If an CRC error occurs more than the maximum number of retransmission attempts, a reception impossible is reported and then a reception process ends.

7) If there is no CRC error, a reception complete is reported and thereafter the reception process ends.

Herein, the Rx bit string is demodulated by using a channel estimation value through a CRS. Since a weight using a signal to noise ratio (SNR) estimation value has been previously applied, a retransmission signal is combined by using a simple addition with the same weight.

Meanwhile, an interference cancellation may be preferably performed on a CRS of a neighboring cell.

However, if the interference cancellation is performed on the CRS of the neighboring cell, the above process needs to be improved since quality of a data signal received from a serving cell may change according to the number of neighboring cells which are targets of the interference cancellation. That is, in case of a receiver to which an interference cancellation function for the CRS is applied, a change occurs in a reliability of channel estimation/SNR estimation for the serving cell according to the number of neighboring cells which are targets of the interference cancellation and according to whether a CRS collision occurs between the serving cell and the neighboring cell. This is described below with reference to FIG. 12.

FIG. 12 shows an interference caused by a CRS of a neighboring cell.

Figure 12A:
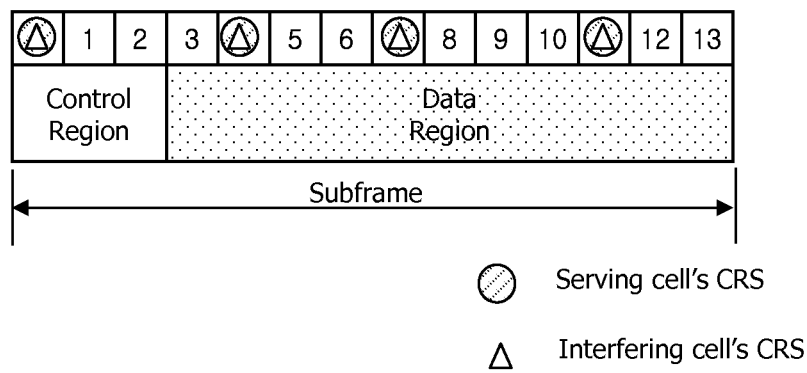
FIG. 12 shows an interference caused by a CRS of a neighboring cell.

Referring to FIG. 12(a), if CRSs collide with each other between a serving cell and an interfering cell, a reliability of the CRS of the serving cell is increased when removing the CRS from an interfering neighboring cell by performing an interference cancellation on the CRS.

Figure 12B:
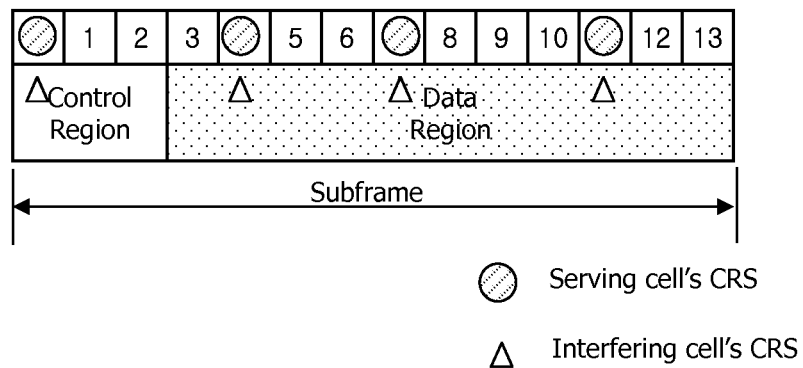

However, as shown in FIG. 12(b), even if CRSs do not overlap with each other between the serving cell and the interfering neighboring cell, the CRS of the interfering neighboring cell collides with data of the serving cell. In this case, there is no significant change in a reliability of channel estimation through the CRS of the serving cell. On the other hand, actual noise power of a data region overlapping with the CRS of the neighboring cell is decreased with respect to noise power estimated through the CRS of the serving cell.

As a result, if the interference cancellation is performed on the CRS, the aforementioned demodulation process needs to be improved.

Hereinafter, an improved demodulation process is described according to one disclosure of the present specifiction with reference to FIG. 13.

Figure 13:
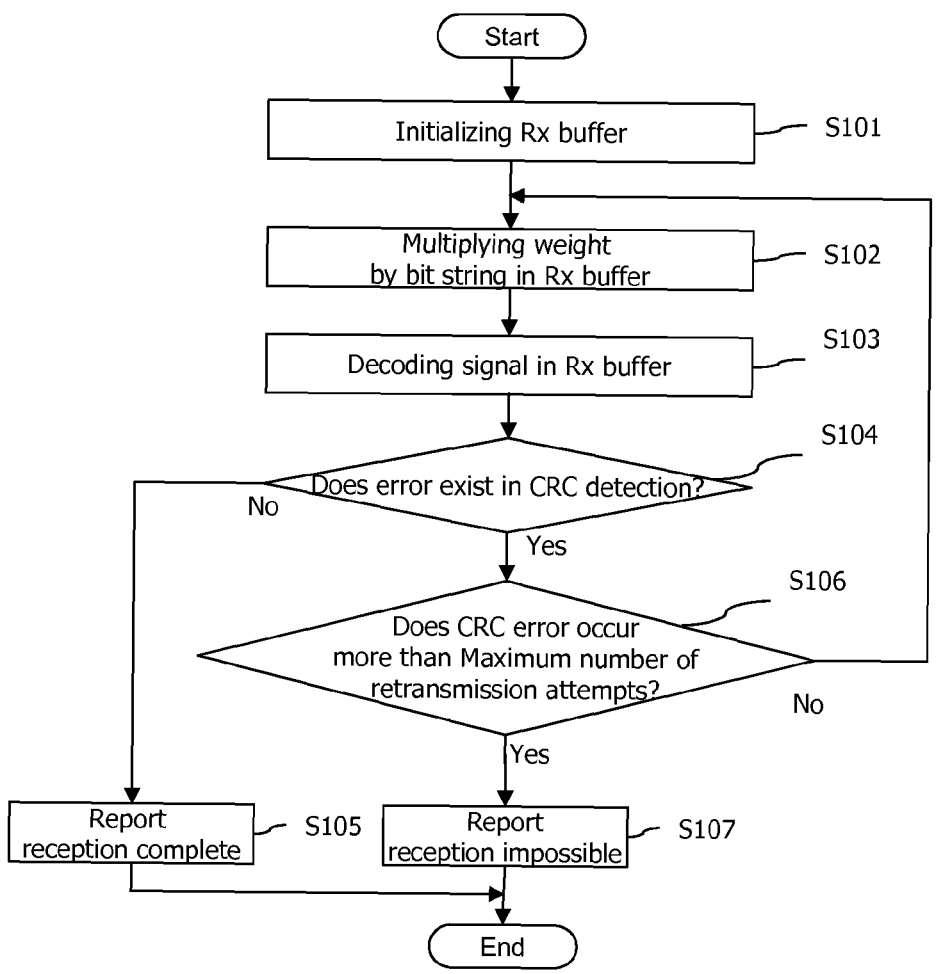
FIG. 13 is a flowchart illustrating an enhanced demodulation procedure according to one disclosure of the present specification.

FIG. 13 is a flowchart illustrating an enhanced demodulation procedure according to one disclosure of the present specifiction.

1) First, an Rx buffer is initialized (S101).
2) Next, a weight $S(N_{IC}^{C}, N_{IC}^{NC})$ is multiplied by a currently received Rx bit string at a corresponding location of the Rx buffer (S102), and thereafter is combined with a previously received bit string.

The weight $S(N_{IC}^{C}, N_{IC}^{NC})$ may be acquired by using a table below. Herein, $N_{IC}^{C}$ denotes the number of neighboring cells if an interference cancellation function is applied to the CRS of the neighboring cell colliding with the CRS of the serving cell. Further, $N_{IC}^{NC}$ implies the number of neighboring cells if the interference cancellation function is applied to the CRS of the neighboring cell which does not collide with the CRS of the serving cell but collides with data.

3) Next, decoding is performed on the combined signal (S103).

4) An error is recognized through CRC detection (S104).

5) If there is a CRS error, it is confirmed whether it occurs more than the maximum number of retransmission attempts (S106). If the CRC error occurs within the maximum number of retransmission attempts, the above processes of S103 and S104 are repeated.

6) However, if the CRC error occurs more than the maximum number of retransmission attempts, a reception impossible is reported (S107), and thereafter a reception process ends.

7) Meanwhile, if there is no CRC error, a reception complete is reported (S105), and thereafter the reception process ends.

TABLE 1

|  |  | $N_{IC}^{NC}$ | | | |
| --- | --- | --- | --- | --- | --- |
|  |  | 0 | 1 | ... | N − 1 | N |
| $N_{IC}^{C}$ | 0 | 1 | $S_{0\_1}$ | ... | $S_{0\_N-1}$ | $S_{0\_N}$ |
|  | 1 | $S_{1\_0}$ | $S_{1\_1}$ | ... | $S_{1\_N-1}$ | |
|  | ... | ... | ... | ... | | |
|  | N − 1 | $S_{N-1\_0}$ | $S_{N-1\_1}$ | | | |
|  | N | $S_{N\_0}$ | | | | |

As shown in Table 1 above, a different weight may be applied to each of cases where CRSs collide with each other between a serving cell and a neighboring neighboring cell and where the collision does not occur.

Each weight of Table 1 may be determined according to an amount of interference that can be cancelled by CRS-IC.

If an interference cancellation is additionally performed on two or more interfering channels, a table such as Table 1 may exist for each interfering channel.

Meanwhile, the values of Table 1 may be exemplified as shown in Table 2 under the assumption that CRS-IC can cancel up to two input interferences. In this case, a gain is assumed to 3 dB if a CRS of a serving cell collides with a CRS of a neighboring cell when the CRS-IC is performed one time, and is assumed to 2 dB if the CRS of the serving cell does not collide with the CRS of the neighboring cell.

TABLE 2

|  |  | $N_{IC}^{NC}$ | | |
| --- | --- | --- | --- | --- |
|  |  | 0 | 1 | 2 |
| $N_{IC}^{C}$ | 0 | 1 | 1.26 | 1.78 |
|  | 1 | 1.41 | 1.89 | |
|  | ... | 1.99 | | |

In actual implementation, such a weight varies depending on a performance of the applied CRS-IC, and an optimal value may be determined through simple measurement under a situation where a specific amount of interference is applied.

Through the aforementioned process, a reliability change of an Rx signal according to whether to apply the interference cancellation is considered as a weight in re-combination with a previous signal, thereby being able to acquire a reception efficiency improvement.

Embodiments described up to now may be implemented by using various means. For example, the embodiments of the present invention may be implemented by using hardware, firmware, and software entities or by combining them. More specifically, this is described with reference to FIG. 14.

Figure 14:
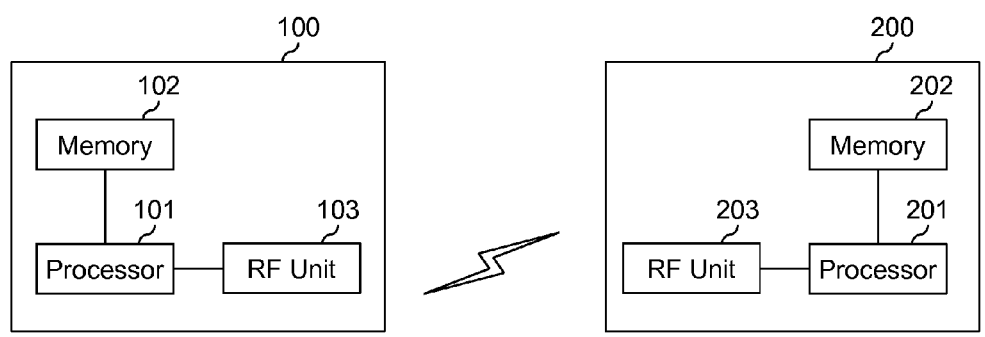
FIG. 14 is a block diagram illustrating a wireless communication system according to an embodiment of the present invention.

FIG. 14 is a block diagram illustrating a wireless communication system according to an embodiment of the present invention.

ABS 200 includes a processor 201, a memory 202, and an RF (radio frequency) unit 203. The memory 202 coupled to the processor 201 stores a variety of information for driving the processor 201. The RF unit 203 coupled to the processor 201 transmits and/or receives a radio signal. The processor 201 implements the proposed functions, procedure, and/or methods. In the aforementioned embodiment, an operation of the BS may be implemented by the processor 201.

A wireless device 100 includes an RF unit 110, a processor 120, and a memory 130. The memory 130 coupled to the processor 120 stores a variety of information for driving the processor 120. The RF unit 110 coupled to the processor 120 transmits and/or receives a radio signal. The processor 120 implements the proposed functions, procedure, and/or methods. In the aforementioned embodiment, an operation of the wireless device may be implemented by the processor 120.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The present invention may be used in a terminal, base station or extra other devices of a wireless communication system.

What is claimed is:

1. A receiving method the method comprising:
cancelling interference caused by a CRS (Cell-specific Reference Signal) of a neighboring cell from a bit string received from a serving cell;
determining a weight to be applied to the received bit string;
applying the determined weight to the received bit string; and
decoding the bit string to which the determined weight is applied,
wherein the weight is determined based on whether the interference is caused by CRSs colliding with each other between the serving cell and the neighboring cell,
wherein the weight is determined by using a table in which a column and a row are each mapped to a number of colliding neighboring cells when CRSs collide and to a number of non-colliding neighboring cells when the CRSs do not collide.

2. The method of claim 1, wherein the determined weight varies based on whether CRSs collide.

3. The method of claim 1, further comprising checking whether a CRC (Cyclic Redundancy Check) error exists with respect to the decoded signal.

4. The method of claim 3, further comprising determining whether the CRC error occurs more than a maximum number of retransmission attempts if the CRC error exists.

5. The method of claim 1, further comprising applying the determined weight to the received bit string and combining the bit string with a previously received bit string if the received bit string corresponds to a retransmission according to HARQ (Hybrid Automatic Repeat Request).

6. A terminal of a wireless communication system, the terminal comprising:
an RF (radio frequency) unit; and
a processor for:
controlling the RF unit to cancel interference caused by a CRS (Cell-specific Reference Signal) of a neighboring cell from a bit string received from a serving cell;
determining a weight to be applied to the received bit string; and
decoding the bit string to which the determined weight is applied,
wherein the weight is determined based on whether the interference is caused by CRCs colliding with each other between the serving cell and the neighboring cell,
by using a table in which a column and a row are each mapped to a number of colliding neighboring cells when CRSs collide and to a number of non-colliding neighboring cells when the CRSs do not collide.

7. The terminal of claim 6, wherein the RF unit includes an interference canceller.

8. The terminal of claim 6, wherein the determined weight varies based on whether CRSs collide.

9. The terminal of claim 6, wherein the processor is further for checking whether a CRC (Cyclic Redundancy Check) error exists with respect to the decoded signal.

10. The terminal of claim 9, wherein the processor is further for determining whether the CRC error occurs more than a maximum number of retransmission attempts if the CRC error exists.

11. The terminal of claim 6, wherein the processor is further for applying the determined weight to the received bit string and combining the bit string with a previously received bit string if the received bit string corresponds to a retransmission according HARQ (Hybrid Automatic Repeat Request).

* * * * *